Figures 5, 6:
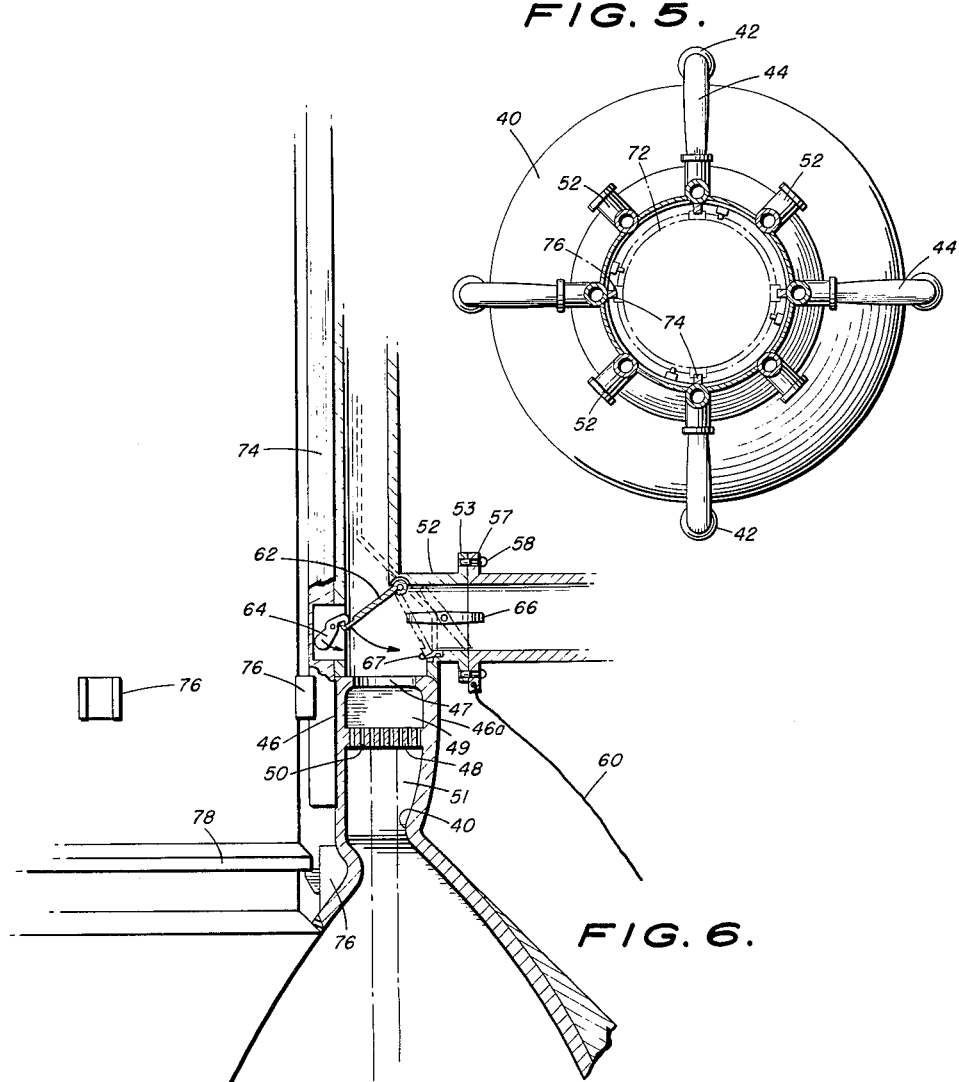

March 29, 1966  C. J. SWET  3,242,811
ROCKET VEHICLE AND LAUNCHING SYSTEM THEREFOR
Filed April 24, 1964  3 Sheets-Sheet 1
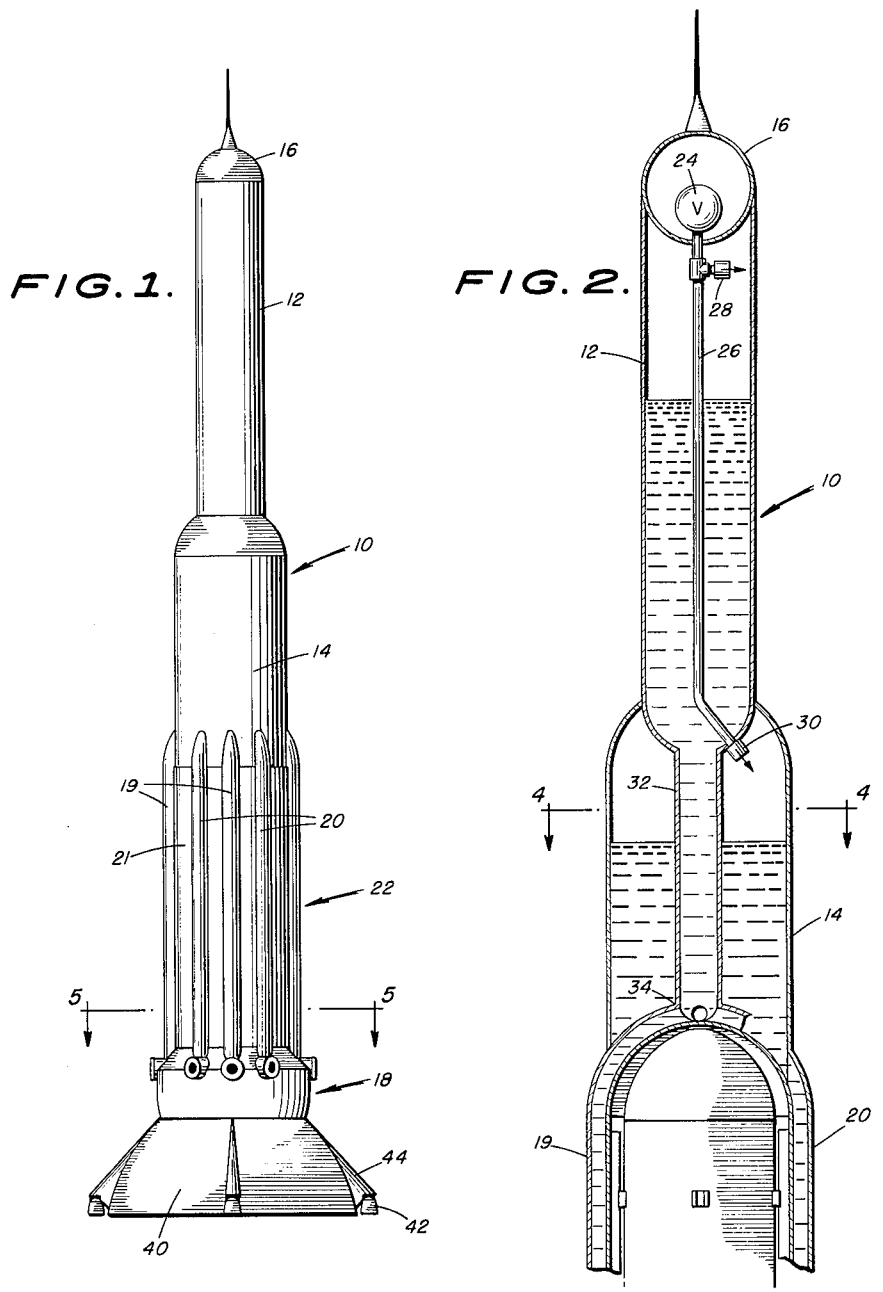
CHARLES J. SWET
INVENTOR.
BY Claude Funkhouser
ATTORNEY March 29, 1966 C. J. SWET 3,242,811
ROCKET VEHICLE AND LAUNCHING SYSTEM THEREFOR
Filed April 24, 1964 3 Sheets-Sheet 2
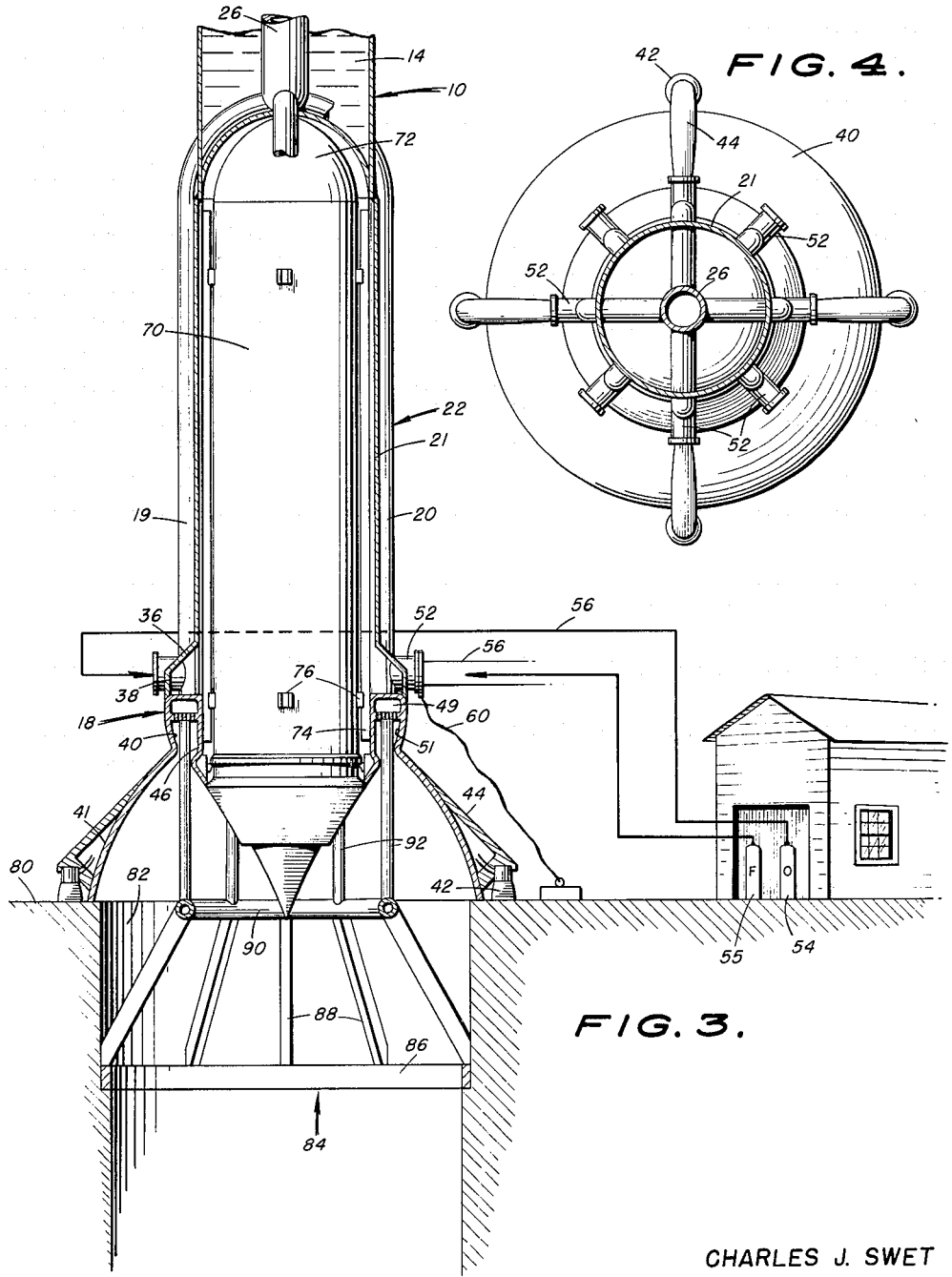
CHARLES J. SWET
INVENTOR.
BY
Claude Funkhouser
ATTORNEY March 29, 1966  C. J. SWET  3,242,811
ROCKET VEHICLE AND LAUNCHING SYSTEM THEREFOR
Filed April 24, 1964  3 Sheets-Sheet 3

CHARLES J. SWET
INVENTOR.

BY Claude Funkhouser
ATTORNEY

United States Patent Office 3,242,811
Patented Mar. 29, 1966

---

3,242,811
ROCKET VEHICLE AND LAUNCHING SYSTEM THEREFOR
Charles J. Swet, Mount Airy, Md., assignor to the United States of America as represented by the Secretary of the Navy
Filed Apr. 24, 1964, Ser. No. 362,539
9 Claims. (Cl. 89—1.7)

The present invention relates generally to multi-stage rocket vehicles and more particularly to an improved rocket vehicle and launching system therefor especially adapted for use for propelling a large payload, such as a satellite, into a space environment.

Undesirable characteristics of large liquid propellant boosters now in use include their requirement for complex turbopump feed systems, and their slow, and thus costly, speed of ascent. The turbopump, with its gas generator and controls, accounts for much of the high cost and long development time required for liquid engines. Turbopumps have been used, however, because prime reliance upon ullage pressure would involve the use of excessively heavy tanks, and for the reason that the low initial acceleration and relatively short and thick geometry preclude much benefit from liquid inertial head. Slow ascent creates high gravitational losses, but is necessary to assure low $g$-loading of the relatively lightweight booster structure and to limit aerodynamic heating of the payload and upper stages. By virtue of their squat geometry the conventional booster tanks provide a minimal weight thrust structure to accommodate high axial and bending loads imposed by the mass of the upper stages.

One of the more important objects of the present invention, therefore, is to provide a rocket vehicle and launching system therefor employing booster propellant tanks mounted above the payload and the later-firing rocket stages, whereby the conventional booster turbopump may be dispensed with.

Another object of the invention resides in the provision of a rocket vehicle and launching system therefor wherein the payload is supported within the relatively large body portion of the vehicle rather than in the apex or nose cone thereof, with the result that substantially larger payloads can be carried than in conventional rocket vehicles.

A further object of the invention is to provide apparatus for the purpose set forth wherein the payload and sustainer rocket stages, being mounted within the rocket body, are protected from damage during launching operations.

As still another object, the invention provides, in a rocket vehicle and launching system therefor, a rocket vehicle that will be capable of higher acceleration than a conventional rocket, and will thus have a shorter burning time, with the result that more efficient use is made of the available impulse.

Other objects and many of the attendant advantages of the present invention will be readily appreciated as the same becomes better understood by reference to the following description when considered in connection with the accompanying drawings, wherein:

FIG. 1 is a side elevation of the rocket vehicle of the present invention;
FIG. 2 is an enlarged detail section of the rocket vehicle;
FIG. 3 is an enlarged section particularly showing the vehicle positioned at the launching area prior to launching;
FIG. 4 is a section on the line 4—4 of FIG. 2;
FIG. 5 is a section on the line 5—5 of FIG. 1; and
FIG. 6 is an enlarged detail section particularly showing the fuel and oxidizer control valves, the support structure for the later-firing rocket and payload, and the mixing chamber construction.

The invention constituting the subject matter of the instant patent application may be characterized as a new design concept, wherein the booster propellant tanks of the rocket vehicle are positioned above the payload and above later-firing rocket stages. The booster propellant tanks carry a storable propellant, such as the combination of an oxidizer ($N_2O_4$) plus a fuel mixture such as $N_2H_4$ and Unsymmetrical Dimethyl Hydrazine, which is fed to a single annular thrust chamber or combustor, located near the lower end of the vehicle, through annularly spaced ducts that are arranged to form a housing which surrounds and protects the payload and later-firing stages. The propellant is burned at moderate chamber pressures in the thrust chamber and is then expanded externally to maximize the low altitude thrust coefficient. The propellant tanks consist of an elongated oxidizer container surmounted by a similar fuel tank.

The vehicle is supplied with its initial starting impulse from propellants stored in ground-pressurized tanks, to produce a high lift-off acceleration. Ground stored propellant is delivered to the vehicle through a plurality of flexible conduits which are disconnected from said vehicle by umbilical cords a suitable time after launch. Upon lift-off, and prior to separation of the ground stored propellant pipes from the vehicle, transfer valves, mounted on the vehicle, function to permit the flow of fuel and oxidizer from the tanks on the vehicle to the combustion chamber. The fuel and oxidizer in the tanks acquire sufficient inertial head from lift-off acceleration to sustain the initial thrust level, assisted by enough ullage pressure to stabilize the fuel tank structure. Throughout the boost phase of the vehicle, rising thrust/weight combines with falling liquid level and decaying ullage pressure to support either constant or programmed chamber pressure. Pitch and yaw of the vehicle may be controlled by regulating fuel flow to each quadrant, and vernier rockets control roll. After the fuel and oxidizer in the tanks carried by the vehicle have been expended, the vernier rockets accelerate the spent booster so that it will clear the payload and later-firing stages.

Referring now more particularly to the drawings, and first to FIGS. 1 and 2 thereof, the body of the improved rocket vehicle is shown generally at 10. The body 10 includes a fuel tank 12, of relatively small diameter, an oxidizer tank 14, of relatively large diameter, secured to the lower end of the fuel tank, and a spherical fuel and oxidizer pressurization tank 16, fitted in the upper end of the fuel tank 12. A combustor 18 is mounted below the oxidizer tank in spaced relation thereto, and is connected to said tank by a plurality of annularly arranged fuel and oxidizer ducts 19 and 20. As best seen in FIG. 2, the ducts 20 are arranged with alternate ones connected to the fuel tank and alternate other ones connected to the oxidizer tank. As shown in FIG. 1, the ducts 19 and 20, in cooperation with the lower end of the oxidizer tank, the combustor 18, and an outer skin 21 between the ducts, define a housing 22.

As best seen in FIG. 2, the fuel in the tank 12 and the oxidizer in the tank 14 are pressurized by a suitable gas, such as nitrogen, that is carried in the pressurization tank 16. Gas flow from the pressurization tank 16 is controlled by an inertia operated valve 24 in said tank, and is conducted to the corresponding upper ends of the tanks 12 and 14 by an axially disposed pipe 26 and discharged through ports 28 and 30. The lower end portion of the fuel tank 12 has a reduced section 32 which extends into the oxidizer tank 14 and terminates in a manifold 34 that distributes fuel to the ducts 19. The ducts 20 are connected directly at their upper ends to the tank 14. As will be seen, the ducts 19 and 20 and the skin 21 provide a slightly greater diameter for the housing 22 than that of the tank 14.

The structure of the combustor 18 is best illustrated in FIGS. 3 and 6. By referring to these views it will be seen that said combustor includes aerodynamic fairing defining an inclined top wall 36 and a side wall 38. An exhaust nozzle 40, having a flared skirt 41, is secured to the lower ends of the ducts 19 and 20, and mounted on the rim of the nozzle 40 are vernier rockets 42 which are supported by contoured brackets 44. By referring to FIG. 4, it will be seen that the rockets 42 are four in number, and may be used to control roll in powered flight. The rockets may be of the solid propellant variety or may utilize propellants from the tanks 12 and 14.

As best seen in FIG. 6, the combustor 18 includes an inner wall 46 which is shaped at its lower end to contour to the exhaust nozzle of a later-firing rocket positioned in the housing 22, as will be described in more detail hereinafter. The inner wall 46 is connected to the side wall 46a of the combustor by vertically spaced radial walls 47 and 48, to define annular injector heads 49. As shown in FIG. 6, the injector heads are provided with discharge openings 50, and function not only to direct fuel and oxidizer into the combustion chamber, shown at 51 for mixture and burning therein, but also to receive the upper ends of supports, to be described in more detail hereinafter. The upper wall 47 receives the lower ends of the ducts 19 and 20, so that fuel and oxidizer may flow into the injector heads 49 upon opening of valves, to be described hereinafter.

Connected to the lower end portion of each of the ducts 19 and 20 is an inlet pipe 52 having a flange 53 at its outer end. As shown diagrammatically in FIG. 3, the inlet pipes for the ducts 19 are connected to an oxidizer tank 54, and those for the ducts 20 to a fuel tank 55, the tanks 54 and 55 being located in a suitable enclosure in the launching area but remote from the vehicle itself. The connections between the pipes 52 and the tanks 54 and 55 are effected by conduits 56 having flanges 57 which are displaceably connected to the flanges 53 by pins 58. Umbilical cord, one of which is shown at 60, are connected between the flanges 57 and a fixed surface.

Positioned in each of the ducts 19 and 20 at the junction thereof with its associated inlet pipe 52 is a valve 62. The valves 62 are hinged to the pipes 52 in such a manner that when they are shifted fully to the left, as viewed in FIG. 6, they shut off flow of fuel and oxidizer from the tanks 12 and 14, whereas, when they are moved fully to the right, they close the inner ends of the pipes 52. The valves 62 are initially positioned as shown in FIG. 6, and are retained in this position by inertia controlled latches 64. To prevent flow of fuel and oxidizer prior to vehicle launching, a butterfly valve 66, mounted in each of the inlet pipes 52, is employed. The valves 62 are retained in open position, as shown in broken lines in FIG. 6, by detents 67, and by internal pressure, after said valves have been shifted to open position by fuel and oxidizer flow.

Displaceably mounted in the housing 22 is a later-firing rocket stage 70 on the upper end of which is positioned a payload 72. The rocket stage 70 and payload 72 are shown by way of example only. It should be understood that more than one later-firing rocket may be used, and that the payload may be a satellite or other structure. Jettison rails 74, mounted on alternate ducts 19 and 20 (FIG. 5) and slidably engageable in latches 76 on the rocket 70, permit displacement of said rocket and the payload 72 from the vehicle upon exhaustion of the fuel and oxidizer from the tanks 12 and 14. To retain the rocket 70 and payload 72 in the housing 22 during acceleration of the body 10 latches 76, one of which is best seen in FIG. 6, are employed. The latches 76 are secured to the inner surface of the contoured portion of the wall 46 of the combustor 18 and engage under a rim 78 on the lower end portion of the rocket 70. The latches are released upon decay of the thrust developed by the propellant burning in the chamber 51. Obviously, other types of latches could be used.

Referring again to FIG. 3, the launching area is shown at 80, and includes an opening or silo 82, over which the rocket vehicle, including the body 10 and the later-burning rocket and payload, are positioned for launching. For supporting the vehicle over the silo a stand 84 is employed. The stand may conveniently consist of a frame, of generally frusto-conical shape, including a base ring 86, an annular series of side member 88, and a top ring 90. Rising from the top ring 90 are support rods 92, arranged in an annular series. The support rods extend upwardly within the combustor 18 and engage the walls 48 of the injector heads.

In use, when it is desired to launch the rocket vehicle, the gate valves 66 are opened, whereupon fuel and oxidizer will be admitted to the injector heads 49. Burning of the propellant constituted by the mixed fuel and oxidizer will produce thrust for quickly accelerating the vehicle (and lifting it from the support rods 92). Vertical travel of the vehicle will cause the umbilical cords 60 to break the connection between the inlet pipes 52 and the conduits 56. At the same time the inertia operated valve 24 will open, causing the pressurizing gas to flow into tanks 12 and 14, whereupon fuel and oxidizer will flow down the ducts 19 and 20. The valves 62 will be released, by the action of the inertia operated latches 64, and fuel and oxidizer will flow into the injector heads 49. Burning of propellant (the mixed fuel and oxidizer) will produce thrust at the nozzle 41 for propelling the vehicle along its course. The vernier rockets 42 are ignited at or immediately before lift-off of the vehicle, and may be controlled, by means not shown, for controlling roll of said vehicle. The latches 76 will retain the later-ring rocket and payload in the housing 22 until the propellant produced by the fuel and oxidizer in the tanks 12 and 14 is exhausted, when said latches will be released.

When the propellant produced by the fuel and oxidizer is consumed, the vernier rockets 42 will continue to produce thrust and will move the body 10 forwardly, when the later-firing rocket 70 and payload 72 will move out of the housing 22, along the jettison rails 74. The vernier rockets 42 will be gimballed or rotated, so that the body 10 will be maneuvered out of the way of the payload and later-firing rocket, which will then ignite and proceed along its programmed course.

It is desired particularly to point out, as advantages for the present invention, that the engine and thrust structure enclose the payload and later-firing rocket stage or stages, thus shielding them from the aerodynamic environment, and locally reacting all principal loads. Payload space is much less confined than in a nose fairing, and the sheltered rocket stages can be optimized for their ultimate functions. Moreover, the absence of launching gantries, service towers and umbilical masts greatly reduces costs and simplifies marine launching schemes. All pre-launch service points are accessible and ground lines and umbilical cables are short and easily supported.

Obviously, many modifications and variations of the present invention are possible in the light of the above teachings. It is therefore to be understood that within the scope of the appended claims the invention may be practiced otherwise than as specifically described.

What is claimed is:

1. A rocket vehicle and launching system therefor including a payload,
   at least one rocket stage carried by the rocket vehicle and mounted beneath the payload,
   a body having a housing surrounding the payload and rocket stage and initially connected therewith,
   said body including a source of propellant therein,
   propellant supply means remote from the vehicle and initially connected therewith,
   said vehicle being initially accelerated by the propellant from said supply means,
   means for transferring propellant flow to the source of propellant in the body following initial acceleration of the vehicle,
   means for disconnecting the body from the payload and rocket stage upon depletion of the source of propellant in the body, and
   means on the body for imparting thrust thereto for moving said body from about the payload and rocket stage and clear thereof upon depletion of the source of propellant in the body.

2. In a rocket vehicle and launching system therefor,
   a body including fuel, oxidizer and pressurization tanks mounted vertically in tandem,
   a combustor,
   ducts connecting the combustor with the oxidizer tank and providing communication between the combustor and said fuel and oxidizer tanks,
   means providing communication between the pressurization tank and said fuel and oxidizer tanks,
   said combustor being spaced from said oxidizer tank therebeneath whereby to define a housing,
   a payload initially in the housing,
   said fuel and oxidizer mixing and burning in the combustor to provide thrust for the vehicle, and
   means on the combustor and operable for separating the body from the payload upon depletion of fuel and oxidizer from the fuel and oxidizer tanks.

3. A rocket vehicle and launching system therefor as recited in claim 2, wherein said last-mentioned means comprises a plurality of vernier rockets.

4. A rocket vehicle and launching system therefor as recited in claim 2, including additionally propellant supply means remote from the vehicle and detachably connected therewith for imparting an initial acceleration thereto.

5. A rocket vehicle and launching system therefor, as recited in claim 4, including additionally valve means for supplying fuel and oxidizer from the fuel and oxidizer tanks upon detachment of the remotely located propellant supply means from the body.

6. A rocket vehicle and launching system therefor as recited in claim 2, wherein the first-mentioned means comprises an inertia operated valve in the pressurization tank, and feed pipes connected to said valve and extending into the fuel and oxidizer tanks.

7. In a rocket vehicle and launching system therefor,
   a payload,
   rocket stages mounting beneath the payload,
   a body having a plurality of tanks and a combustor,
   said combustor being mounted in spaced relation to one of the tanks,
   ducts connecting certain of the tanks to the combustor and surrounding the payload and rocket stages,
   means initially connecting the body to the payload and rocket stages,
   a source of propellant fluid positioned remotely from the vehicle,
   conduits connecting the source with the vehicle,
   valve means initially permitting propellant fluid to flow from said source to the combustor for burning therein, whereby an initial acceleration impulse will be imparted to the vehicle,
   means for releasing the conduits from the vehicle following the initial acceleration impulse,
   said valve means being shiftable following said initial acceleration impulse for permitting certain of said tanks to supply propellant stored therein to said combustor for burning,
   said first-mentioned means disconnecting the rocket stages and payload from the body upon complete discharge of the propellant from certain of said tanks, and
   means on the combustor for imparting a further forward thrust to the body upon depletion of the propellant in the tanks, whereby said body will be caused to move from about the payload and rocket stages to a position clear thereof.

8. In a rocket vehicle and launching system therefor,
   a body including fuel, oxidizer and pressurization tanks mounted vertically in tandem,
   a combustor spaced beneath the lowermost of the tanks,
   ducts connecting the combustor with the oxidizer tank and communicating between the combustor and said fuel and oxidizer tanks,
   said ducts being arranged in an annular series and connected in alternation between the combustor and the oxidizer and fuel tanks and defining a housing,
   a payload initially in the housing,
   a vernier rocket on the combustor and operable for separating the body from the payload upon depletion of fuel and oxidizer from the fuel and oxidizer tanks,
   propellant means remote from the vehicle and connected therewith for providing an initial launching impulse for said vehicle, and
   means in the pressurization tank and operable for pressurizing the fuel and oxidizer upon conclusion of the launching impulse.

9. A rocket vehicle and launching system therefor, comprising
   a launching area having an opening,
   a supporting frame mounted in the opening and extending thereabove,
   a rocket body supported by the frame and having a combustor and propellant tanks,
   said propellant tanks being mounted vertically in tandem and in spaced relation to the combustor whereby to define a housing,
   a payload displaceably mounted in the housing,
   a propellant source in the launching area and remote from the rocket body,
   means detachably connecting the propellant source with the combustor,
   said propellant source providing an initial acceleration impulse for the rocket body whereby said body will be lifted from the supporting frame,
   means detaching said first-mentioned means from the combustor following termination of said initial acceleration impulse,
   means in the rocket body for admitting propellant to the combustor from said propellant tanks upon termination of said initial acceleration impulse,
   means for releasing the payload within the housing upon termination of propellant flow from said tanks, and means on the rocket body for imparting a further forward accelerating impulse to said body upon termination of said flow from said tanks, whereby said body will be caused to move clear of the payload.

References Cited by the Examiner
UNITED STATES PATENTS

| | | | |
|---|---|---|---|
| 2,686,473 | 8/1954 | Vogel | 102—49 |
| 2,962,934 | 12/1960 | Seidner | 89—1.7 |
| 3,026,772 | 3/1962 | Moreland | 89—1.5 |
| 3,048,107 | 8/1962 | Samms | 102—49 |
| 3,049,876 | 8/1962 | Connors | 60—35.6 |
| 3,067,682 | 12/1962 | Feldman et al. | 102—49 |
| 3,145,530 | 8/1964 | Sobey | 102—49 X |

BEJAMIN A. BORCHELT, *Primary Examiner.*
SAMUEL W. ENGLE, *Examiner.*